US012065126B2

(12) United States Patent
Li et al.

(10) Patent No.: US 12,065,126 B2
(45) Date of Patent: Aug. 20, 2024

(54) SUPERVISORY GENSET CONTROL IN RANGE-EXTENDED ELECTRIC VEHICLE

(71) Applicant: Cummins Inc., Columbus, IN (US)

(72) Inventors: Ke Li, Columbus, IN (US); Kenneth M. Follen, Greenwood, IN (US); John P. Kresse, III, Martinsville, IN (US)

(73) Assignee: UNITED STATES DEPARTMENT OF ENERGY, Washington, DC (US)

( * ) Notice: Subject to any disclaimer, the term of this patent is extended or adjusted under 35 U.S.C. 154(b) by 409 days.

(21) Appl. No.: 17/127,057

(22) Filed: Dec. 18, 2020

(65) Prior Publication Data

US 2021/0188246 A1 Jun. 24, 2021

Related U.S. Application Data

(60) Provisional application No. 62/949,756, filed on Dec. 18, 2019.

(51) Int. Cl.
| | | |
|---|---|---|
| *B60W 20/15* | (2016.01) | |
| *B60W 10/06* | (2006.01) | |
| *B60W 10/08* | (2006.01) | |
| *B60W 40/08* | (2012.01) | |
| *B60W 50/02* | (2012.01) | |
| *B60W 50/00* | (2006.01) | |

(52) U.S. Cl.
CPC .......... *B60W 20/15* (2016.01); *B60W 10/06* (2013.01); *B60W 10/08* (2013.01); *B60W 40/08* (2013.01); *B60W 50/0205* (2013.01); *B60W 2050/0008* (2013.01); *B60W 2050/0012* (2013.01); *B60W 2050/0026* (2013.01)

(58) Field of Classification Search
CPC ......... B60K 6/46; B60W 10/06; B60W 10/08; B60W 20/15; B60W 2050/0008; B60W 2050/0012; B60W 2050/0026; B60W 2540/10; B60W 2710/0661; B60W 2710/0672; B60W 2710/0677; B60W 40/08
See application file for complete search history.

(56) References Cited

U.S. PATENT DOCUMENTS

| | | | |
|---|---|---|---|
| 8,825,243 | B2 | 9/2014 | Yang |
| 9,315,114 | B2 | 4/2016 | Oono et al. |
| 9,809,214 | B2 | 11/2017 | Liang et al. |
| 10,144,405 | B2 | 12/2018 | Praxmarer et al. |

(Continued)

FOREIGN PATENT DOCUMENTS

| | | |
|---|---|---|
| WO | 2016021059 A1 | 2/2016 |
| WO | 2018104850 A1 | 6/2018 |

*Primary Examiner* — Jaime Figueroa
*Assistant Examiner* — Zachary Joseph Wallace
(74) *Attorney, Agent, or Firm* — Faegre Drinker Biddle & Reath LLP (57) ABSTRACT

A controls system for a range-extended electric vehicle comprising an overall system control unit, an engine control module configured to control a range extender of the range-extended electric vehicle, power electronics configured to control a generator of the range-extended electric vehicle, and a supervisory control module coupled between the overall system control unit and the engine control module and the power electronics, the supervisory control module configured to receive information from the overall system control unit and provide commands to the engine control module and the power electronics.

20 Claims, 6 Drawing Sheets

(56) References Cited

U.S. PATENT DOCUMENTS

| | | | |
|---|---|---|---|
| 2011/0246010 A1* | 10/2011 | de la Torre Bueno | B60L 50/61 903/902 |
| 2015/0298555 A1* | 10/2015 | Bennett | B60L 50/61 701/22 |
| 2016/0318501 A1* | 11/2016 | Oldridge | B60W 20/12 |
| 2018/0043793 A1* | 2/2018 | Herb | B60L 15/2045 |
| 2018/0154794 A1* | 6/2018 | Hsiao | B60L 7/16 |
| 2019/0047572 A1* | 2/2019 | Bennett | B60K 6/46 |
| 2019/0064793 A1* | 2/2019 | Sun | B60R 16/0236 |
| 2019/0291590 A1* | 9/2019 | Yeung | B60L 50/51 |
| 2020/0158017 A1* | 5/2020 | Vassallo | F01N 3/021 |
| 2021/0053553 A1* | 2/2021 | Akanda | B60W 20/11 |

* cited by examiner

SUPERVISORY GENSET CONTROL IN RANGE-EXTENDED ELECTRIC VEHICLE

CROSS-REFERENCE TO RELATED APPLICATIONS

This application claims the benefit of U.S. Patent Application No. 62/949,756, filed Dec. 18, 2019, the contents of which are hereby incorporated by reference.

STATEMENT REGARDING FEDERALLY SPONSORED RESEARCH OR DEVELOPMENT

This invention was made with government support under DE-EE0007514 awarded by the Department of Energy. The government has certain rights in the invention.

TECHNICAL FIELD OF THE DISCLOSURE

The present disclosure relates generally to a system and methods for supervisory genset control in a range-extended electric vehicle.

BACKGROUND OF THE DISCLOSURE

A range-extended electric vehicle (REEV) generally includes a set of controls for determining a power demand from an operator, and then determining which power source will provide what amount of the desired power to meet the power demand of the operator. Typically, the set of controls includes system controls for determining the operator power demand and the genset power demand, and a genset control system for determining the speed target of the genset, which includes a range extender and/or a generator, and the torque demand for the range extender and/or the generator. However, this controls setup results in an undesired transient performance during sudden power demand changes and various uncertainties. In addition, this control setup does not take into consideration emissions during the transient performance, and the genset control resides in a hybrid system control module, and the system control communicates with the range extender and the generator separately, which makes it difficult to integrate a stand-alone genset to a $3^{rd}$ party REEV. Thus, a control setup is needed that can handle sudden power demand changes without undesired transient performance, take emissions into consideration during its performance, and is capable of being integrated into other REEVs.

SUMMARY OF THE DISCLOSURE

In one embodiment of the present disclosure, a controls system for a range-extended electric vehicle is provided. The control system comprises an overall system control unit, an engine control module configured to control a range extender of the range-extended electric vehicle, power electronics configured to control a generator of the range-extended electric vehicle; and a supervisory control module coupled between the overall system control unit and the engine control module and the power electronics, where the supervisory control module is configured to receive information from the overall system control unit and provide commands to at least one of the engine control module and the power electronics.

In another embodiment of the present disclosure, a method for providing at least one command to at least one of a range extender and a generator of a range-extended electric vehicle is provided. The method comprises determining, by an overall system control unit, a driver power demand, providing, from the overall system control unit, the driver power demand and a desired operation mode to a supervisory control module, determining, by the supervisory control module, at least one of a target speed and a target torque for the at least one of the range extender and the generator, determining, by the supervisory control module, at least one command based on the at least one of the target speed and the target torque, and providing, from the supervisory control module, the at least one command to at least one of an engine control module for controlling the range extender and power electronics for controlling the generator.

In a further embodiment of the present disclosure, a method for determining commands for at least one of a range extender and a generator of a range-extended electric vehicle is provided. The method comprises simultaneously optimizing a trajectory based on at least one operation mode to provide at least one of a speed command and a torque command to the at least one of the range extender and the generator, and controlling the at least one of the speed command and the torque command based on information received from a dynamic genset model and at least one of an actual speed measurement and an actual torque measurement of at least one of the range extender and the generator.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Figure 1:
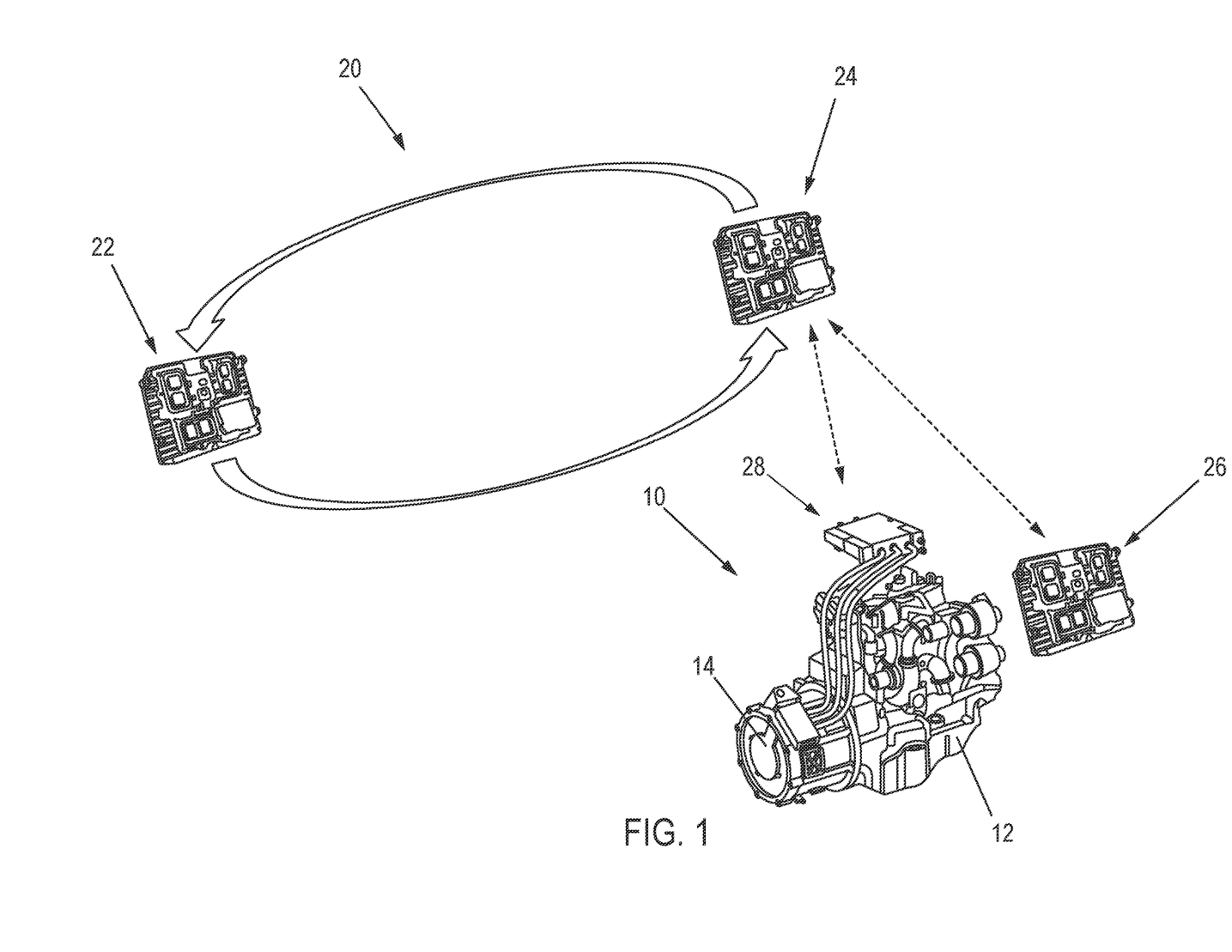
FIG. 1 shows a diagram of an embodiment of a genset and a set of controls of the present disclosure, where the genset includes a range extender and a generator, and the set of controls comprises an overall system control unit, a supervisory control module, an engine control module (ECM), and power electronics.

Referring to FIG. 1, a range-extended electric vehicle (REEV) (not shown) generally includes an electric motor and/or traction motor (not shown), a genset 10 having a range extender 12 and a generator 14, and a battery (not shown). Range extender 12 of genset 10 may be comprised of a variety of power producing devices, including but not limited to, a diesel engine, a gasoline engine, or a natural gas engine. In various embodiments, range extender 12 may be an internal combustion engine. The REEV generally further includes a set of controls 20 comprising an overall system control unit 22, a supervisory control module 24, an engine control module (ECM) 26 coupled to range extender 12, and power electronics 28 coupled to generator 14.

Figure 2:
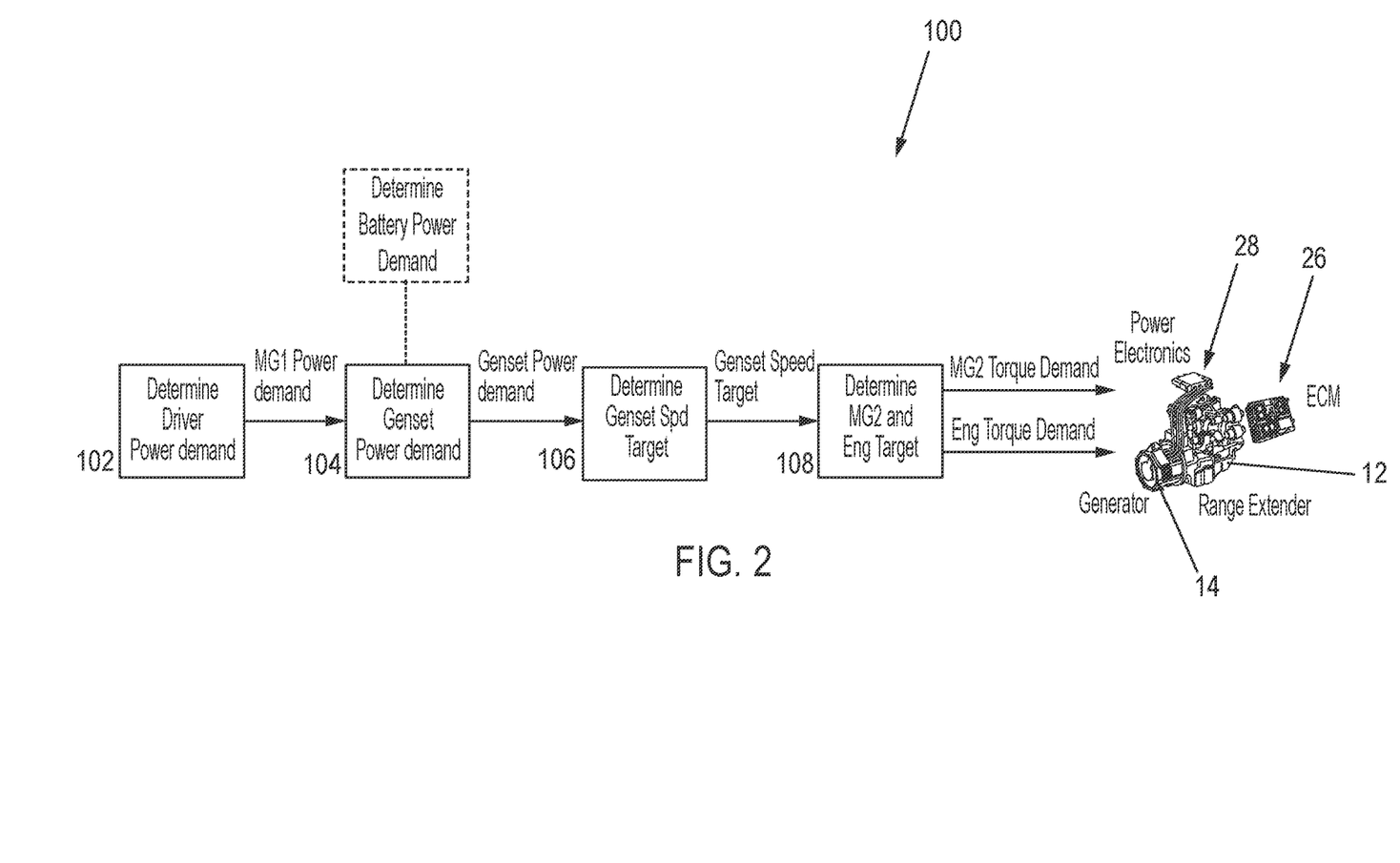
FIG. 2 shows a diagram of an embodiment of a method of the present disclosure for provide commands to the range extender and the generator of FIG. 1.
Figure 3:
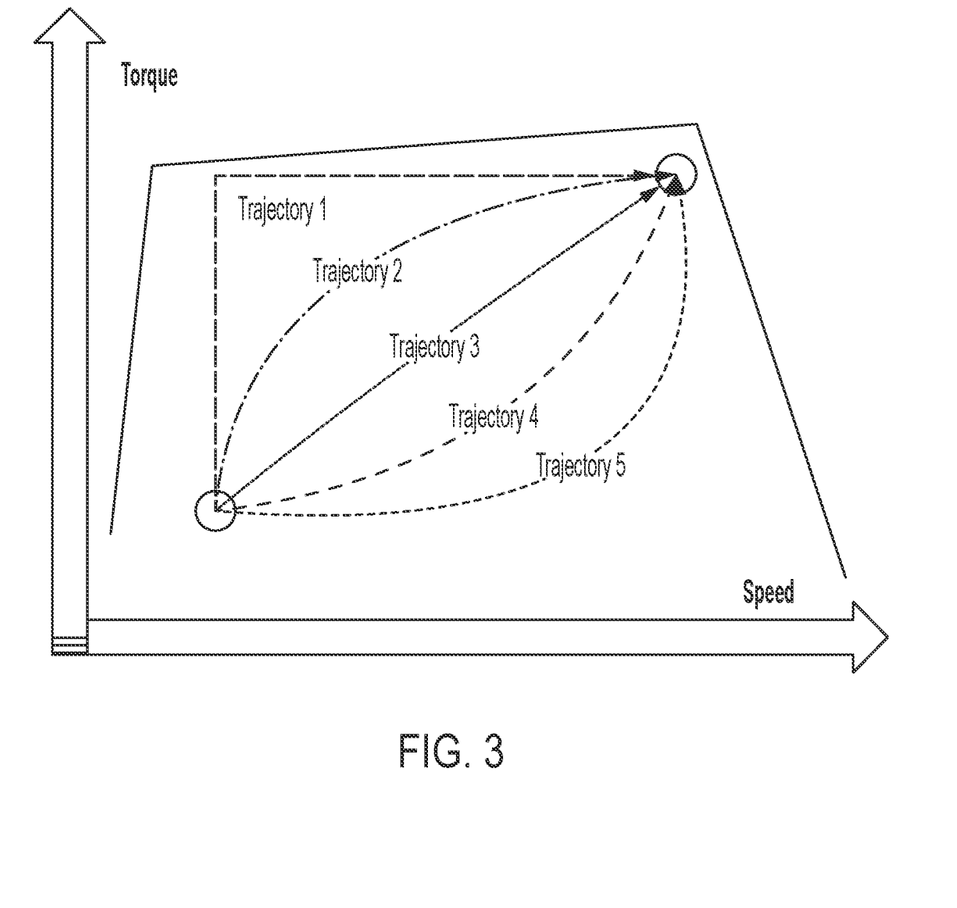
FIG. 3 shows a graphical diagram of a plurality of trajectories for getting from a current operating point to a subsequent operating point dependent on a desired mode of operation and/or method of optimization.

With reference to FIGS. 2 and 3, a general method 100 for providing commands to range extender 12 and/or generator 14 is provided. In general, overall system control unit 22 is first configured to determine a driver power demand at step 102 via a push pedal or other driver interface apparatus. From the determined power demand, a genset power demand is determined at step 104 via overall system control unit 22. In various embodiments, overall system control unit 22 may further determine a battery power demand at step 104. Once the driver power demand and the genset power demand are determined by overall system control unit 22, overall system control unit 22 provides the genset power demand to supervisory control module 24, and supervisory control module 24 determines a genset speed target and/or torque target at step 106. At step 108, supervisory control module 24 determines a desired speed and/or torque demand for range extender 12 and/or generator 14 from the genset speed or torque target determined by supervisory control module 24, and provides said speed/torque demands to ECM 26 for controlling range extender 12 and/or power electronics 28 for controlling generator 14. In various embodiments, steps 106 and 108 may be combined into a single step. For instance, when a lumped online model-based trajectory method of optimization is used (discussed further below), steps 106 and 108 are combined into a single step where online optimization is used to determine torque demands for range extender 12 and/or generator 14.

In general, overall system control unit 22 is configured to determine how much power is needed from range extender 12 and/or generator 14 based on status information regarding the state of range extender 12 and generator 14 received from supervisory control module 24. The status information may include fuel consumption, genset efficiency, actual power delivered, power capability (including static and dynamic power limits), range extender and generator actual states, range extender and/or generator speed and/or torque, generator current and/or voltage, diagnostics, and total energy estimation, among other various types of information.

Supervisory control module 24 is configured to receive target/command information from overall system control unit 20, determine commands for range extender 12 and generator 14 based on said information, translate said commands for providing to ECM 26 and power electronics 28, and provide said commands to ECM 26 for controlling range extender 12 and power electronics 28 for controlling generator 14. The target/command information received by supervisory control module 24 may include a control mode command such as power control mode, voltage control mode or current control mode, a desired operation mode such as performance mode, emission (clean) mode, economy mode, or balanced mode, and/or control targets such as an overall power demand, a voltage target, and/or current target, among other various target/command information. Once the target/control information is received, supervisory control module 24 determines how to get from the current operating point to another operating point in order to meet the power demand.

Power electronics 28 and ECM 26 are configured to provide generator 14 and range extender 12 states and/or feedback information, respectively, to supervisory control module 24, and receive commands from supervisory control module 24 for generator 14 and range extender 12, respectively. The commands provided to generator 14 and/or range extender 12 typically includes commands for changing speed and/or torque of generator 14 and/or range extender 12.

Referring now to FIGS. 3-6, methods for determining speed and/or torque demands for range extender 12 and/or generator 14, and more specifically, methods for optimization of these demands will be described. The trajectory, or change in desired speed and/or torque demands, for getting from the current operating point to the next operating point is dependent on the desired mode of operation and/or the method of optimization (see FIG. 3 showing how trajectories may change based on the different mode of operation and/or methods of optimization). For example, based on the desired mode of operation and/or the method of optimization, more speed and/or torque may be needed from range extender 12 than generator 14 or vice versa. The method of optimization used may include map-based reference trajectory plus feedback speed tracking, online reference trajectory optimization plus feedback speed tracking, or lumped online model-based trajectory optimization, among other methods of optimization.

Figure 4:
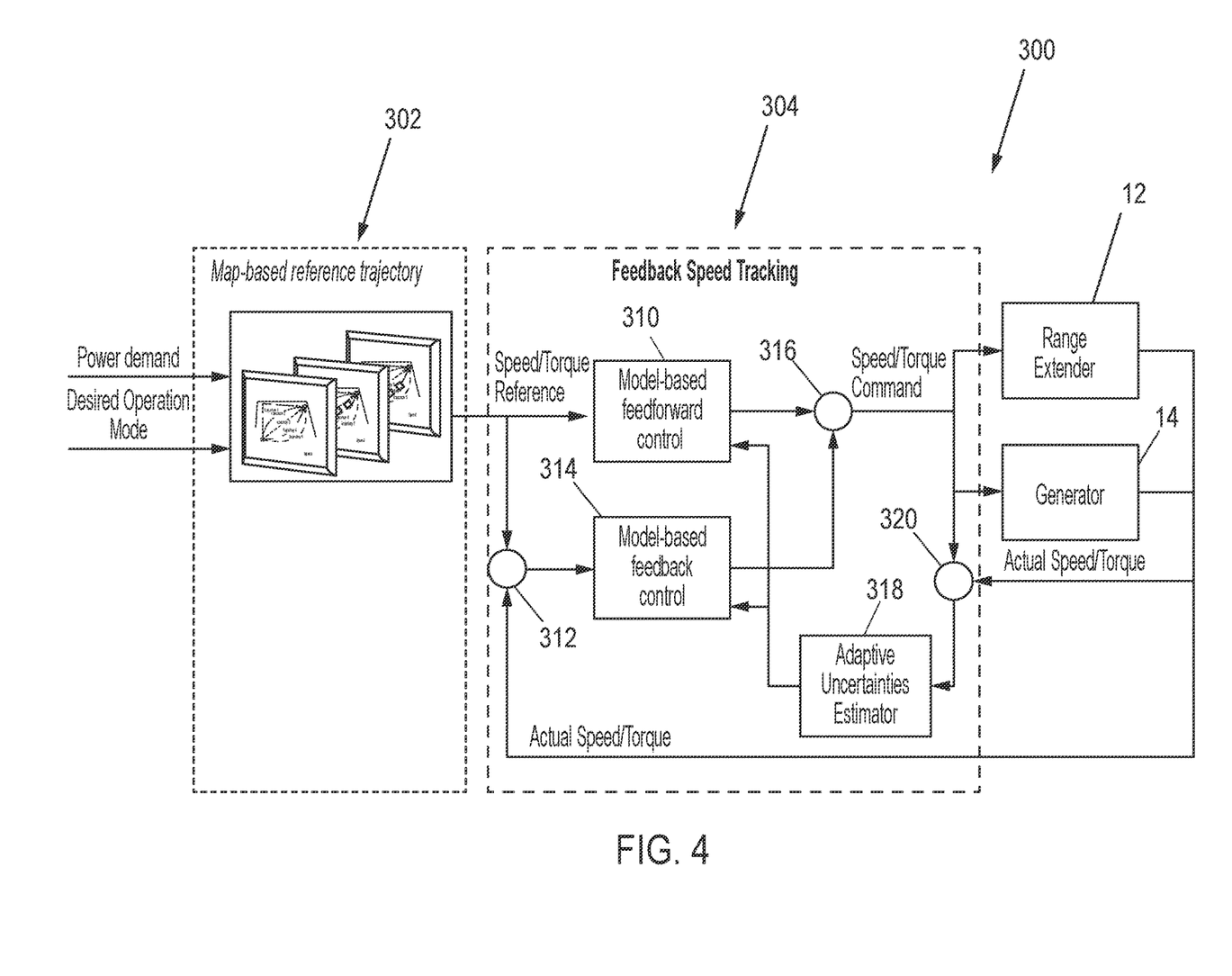
FIG. 4 shows a diagram of a map-based reference trajectory plus feedback speed tracking method of optimization of the present disclosure.

With reference to FIG. 4, the map-based reference trajectory plus feedback speed tracking method of optimization 300 will be described. Map-based method of optimization 300 generally includes a map-based reference trajectory optimization section 302 and a feedback speed tracking section 304. In various embodiments, both sections 302 and 304 are carried out by supervisory control module 24. Map-based reference trajectory section 302 is configured to receive the power demand and desired operation mode from system control unit 22 and determine speed/torque references or desired values based on various lookup tables. These various lookup tables generally include predefined optimized genset trajectories based on different objectives where speed/torque reference(s)/desired values can be determined from these lookup tables based on the desired power demand and the desired operation mode provided. The determined speed/torque reference(s) are then provided to feedback speed tracking section 304.

Feedback speed tracking section 304 is generally configured to correct deviations of the system and update the look up tables based on the information received. Feedback speed tracking section 304 generally includes a model-based feedforward control 310, a first signal aggregator 312, a model-based feedback control 314, a second signal aggregator 316, an adaptive uncertainties estimator 318, and a third signal aggregator 320.

Model-based feedforward control 310 is generally configured to receive the speed/torque reference(s) from map-based reference trajectory section 302 and estimated adaptive uncertainties or adjustments from adaptive uncertainties estimator 318 and provide a suggested speed and/or torque value to second signal aggregator 316. Model-based feedforward control 310 handles the transient in the speed and torque profile, and calculates the suggested speed/torque commands based on both the speed/torque reference(s) and the estimated adaptive uncertainties. Model-based feedforward control 310 contains the dynamics of genset 10 either from physics-based modeling or data-based modeling.

When control 310 receives the desired torque/speed targets, it will use the model information to automatically determine the corresponding commands. First signal aggregator 312 is generally configured to receive the speed/torque reference(s) from map-based reference trajectory section 302 and actual speed/torque from range extender 12 and generator 14, and provide a difference between the speed/torque reference and the actual speed/torque readings to model-based feedback control 314.

Model-based feedback control 314 is generally configured to receive a difference between the speed/torque reference and the actual speed/torque readings from first signal aggregator 312 and estimated adaptive uncertainties from adaptive uncertainties estimator 318, and provide a corrective action to second signal aggregator 316. Model-based feedback control 314 shares the same principle with model-based feedforward control 310 in that it contains the dynamics of genset 10. However, model-based feedback 314 uses the difference between the torque/speed targets and the actual torque/speed feedback signal to determine the corresponding commands.

Second signal aggregator 316 is generally configured to receive a suggested speed/torque from model-based feedforward control 310 and a corrective action from model-based feedback control 314 and provide adjusted speed/torque commands to range extender 12 and generator 14. Third signal aggregator 320 is generally configured to receive the speed/torque commands from second signal aggregator 316 and actual speed/torque from range extender 12/generator 14 and provide this information to adaptive uncertainties estimator 318. Adaptive uncertainties estimator 318 is generally configured to receive speed/torque commands and actual speed/torque from third signal aggregator 320 and provide estimated adaptive uncertainties and/or adjustments. Adaptive uncertainties estimator 318 handles slower drifts and degradation of the sensors or components and mismatches between the model and the physical system based on the command and actual range extender/generator feedback, by providing estimated adaptive uncertainties or adjustments for making corrections to the feedforward and feedback control accordingly.

Figure 5:
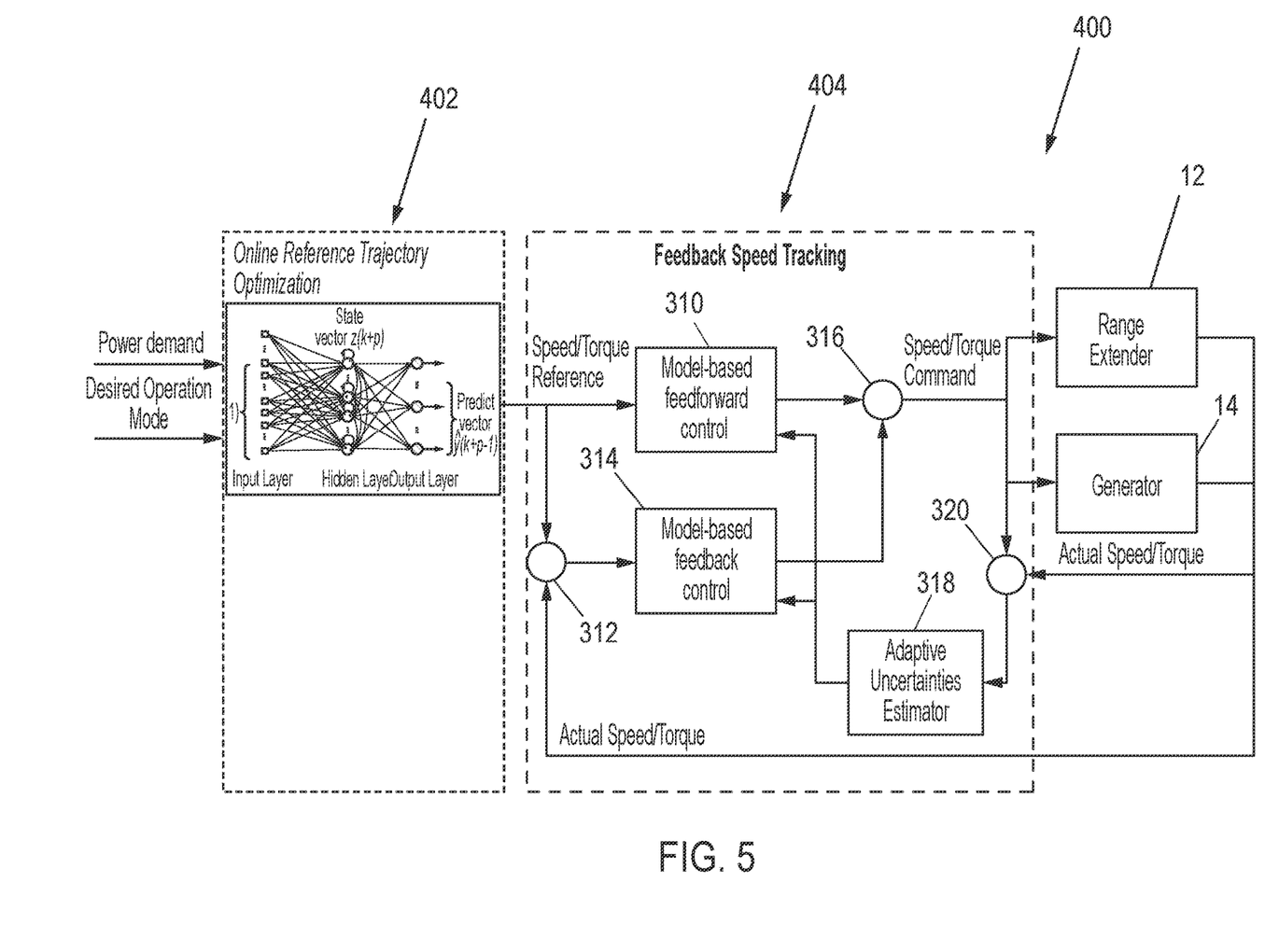
FIG. 5 shows a diagram of an online reference trajectory plus feedback speed tracking method of optimization of the present disclosure.

Referring now to FIG. 5, the online reference trajectory plus feedback speed tracking method of optimization 400 will be described. Online reference method of optimization 400 generally includes an online reference trajectory optimization section 402 and a feedback speed tracking section 404. In various embodiments, both sections 402 and 404 are carried out by supervisory control module 24. Online reference trajectory section 402 is configured to receive the power demand and desired operation mode from system control unit 22 and determine speed/torque references or desired values based on an online optimization algorithm which contains models of the actual system. The model of the actual system generally includes the specific model of generator 14 and range extender 12, and knows the efficient operating zones for each. The optimization algorithm then calculates the optimal commands with the power demands from system control unit 22 and the desired operational mode. The speed/torque reference(s) determined from the online optimization algorithm are then provided to feedback speed tracking section 404 similarly to method of optimization 300. Feedback speed tracking section 404 is configured to operate in the same manner as feedback speed tracking section 304, with section 404 receiving the speed/torque reference(s) from online reference trajectory section 402.

Figure 6:
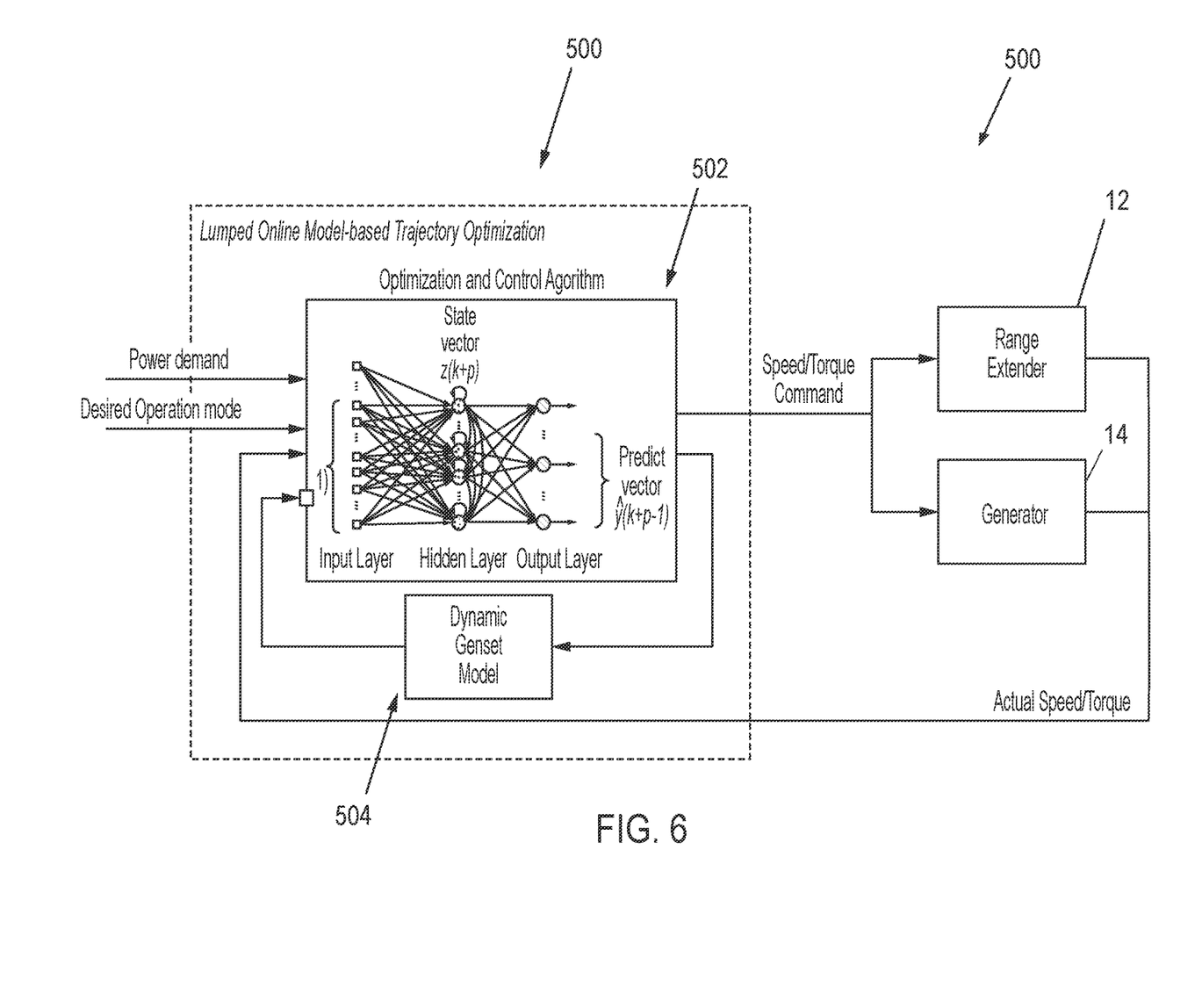
FIG. 6 shows a diagram of a lumped online model-based trajectory method of optimization of the present disclosure.

With reference to FIG. 6, the lumped online model-based trajectory method of optimization 500 will be described. Lumped online method of optimization 500 generally includes a single optimization and control algorithm 502 and a dynamic genset model 504. Lumped online method of optimization 500 uses single optimization and control algorithm 502, to simultaneously optimize the desired torque and/or speed values based on different objectives or operation modes to provide speed and torque commands to generator 14 and range extender 12, and control torque of generator 14 and range extender 12 based on information from dynamic genset model 504 and real time actual measurements of speed and torque of generator 14 and range extender 12. In other words, the single optimal control algorithm combines the trajectory section and the feedback sections of the previously described methods of optimization.

In various embodiments, the method of optimization may also influence air handling control of range extender 12 when high performance is required (i.e., the method may prime the air handling system to decline power faster) and/or thermal management of an aftertreatment control of range extender 12 when low emissions are desired (i.e., based on history/probability of power demand, active thermal management of the aftertreatment system may be scheduled to allow faster heat generation and less fuel consumption during the active thermal management). Furthermore, the method of optimization may also predict the power demand based on historical data and/or statistics of the power demand to assist the method of optimization.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A controls system for a range-extended electric vehicle comprising:
    an overall system control unit;
    an engine control module configured to control a range extender included in a genset of the range-extended electric vehicle; and
    power electronics configured to control a generator included in the genset of the range-extended electric vehicle; and
    a supervisory control module coupled between the overall system control unit and the engine control module and the power electronics, the supervisory control module configured to receive information from the overall system control unit and provide commands to at least one of the engine control module and the power electronics, including a chosen trajectory from among a plurality of possible trajectories, each trajectory in the plurality of possible trajectories relating to a change in at least one of a desired speed demand and a torque demand of an engine system operatively connected to the controls system, each trajectory in the plurality of possible trajectories having a distinct optimization associated therewith between a current operating point to a subsequent operating point dependent on at least one of a desired mode of operation and a method of optimization, and the commands conforming to the chosen trajectory so as to optimize transient operation performance of the genset between the current operating point and the subsequent operating point to meet power demand.

2. The controls system of claim 1, wherein the overall system control unit is configured to determine a driver power demand and a power demand for the generator and the range extender.

3. The controls system of claim 2, wherein a system control unit provides the driver power demand to the supervisory control module.

4. The controls system of claim 3, wherein the supervisory control module determines at least one of a speed target and a torque target.

5. The controls system of claim 1, wherein the information received by the supervisory control module includes a power demand for the generator and the range extender.

6. The controls system of claim 1, wherein the supervisory control module is configured to provide commands to both the engine control module and the power electronics.

7. The controls system of claim 1, wherein the overall system control unit is configured to determine an amount of power needed from at least one of the range extender and the generator based on status information regarding a state of the range extender and the generator received from the supervisory control module.

8. The controls system of claim 7, wherein the status information includes at least one of fuel consumption, genset efficiency, actual power delivered, power capability, static and dynamic power limits, states of the range extender and the generator, speed and/or torque of the range extender and/or the generator, current and/or voltage of the generator, diagnostics, and total energy estimation.

9. A method for providing at least one command to at least one of a range extender and a generator of a range-extended electric vehicle, the range extender and the generator being included in a genset of the range-extended electric vehicle, the method comprising:
    determining, by an overall system control unit, a driver power demand;
    providing, from the overall system control unit, the driver power demand and a desired operation mode to a supervisory control module;
    determining, by the supervisory control module, a chosen trajectory from among a plurality of possible trajectories, each trajectory in the plurality of possible trajectories having a distinct optimization associated therewith between a current operating point of the genset to a subsequent operating point of the genset dependent on at least one of a desired mode of operation and method of optimization and including at least one of a target speed and a target torque for the at least one of the range extender and the generator, each of the target speed and the target torque conforming to the chosen trajectory so as to optimize transient operation performance of the genset between the current operating point and the subsequent operating point to meet power demand;
    determining, by the supervisory control module, at least one command based on the at least one of the target speed and the target torque; and
    providing, from the supervisory control module, the at least one command to at least one of an engine control module for controlling the range extender and power electronics for controlling the generator.

10. The method of claim 9, wherein the at least one of the target speed and the target torque is determined using a map-based trajectory.

11. The method of claim 9, wherein the at least one of the target speed and the target torque is determined using an online reference trajectory.

12. The method of claim 9, wherein the at least one of the target speed and the target torque is determined using a lumped online method of optimization.

13. The method of claim 12, wherein the lumped online method of optimization includes a single optimization and control algorithm and a dynamic genset model.

14. The method of claim 12, wherein the lumped online method of optimization is configured to simultaneously optimize the target torque and/or the target speed by providing speed and torque commands to the generator and the range extender, and control torque of the generator and the range extender.

15. The method of claim 9, wherein the at least one command based on the at least one of the target speed and the target torque is determined using a speed tracking feedback control.

16. The method of claim 15, wherein the speed tracking feedback control includes a model-based feedforward control, a model-based feedback control, and an adaptive uncertainties estimator.

17. A method for determining commands for a genset having at least one of a range extender and a generator of a range-extended electric vehicle, the method comprising:

simultaneously optimizing a trajectory based on at least one operation mode to provide at least one of a speed command and a torque command to the at least one of the range extender and the generator, and controlling the at least one of the speed command and the torque command based on information received from a dynamic genset model and at least one of an actual speed measurement and an actual torque measurement of at least one of the range extender and the generator, wherein the optimizing the trajectory includes determining a chosen trajectory from among a plurality of possible trajectories, each trajectory in the plurality of possible trajectories having a distinct optimization associated therewith between a current operating point to a subsequent operating point dependent on at least one of a desired mode of operation and method of optimization, and wherein each of the speed command and the torque command conform to the chosen trajectory so as to optimize transient operation performance of the genset between the current operating point and the subsequent operating point by adjusting at least one of a speed and a torque of the genset to meet power demand.

18. The method of claim 17, wherein simultaneously optimizing the trajectory is performed via a lumped online method of optimization.

19. The method of claim 18, wherein the lumped online method of optimization provides the at least one of the speed command and the torque command to the at least one of the range extender and the generator and controls the at least one of the speed command and the torque command.

20. The method of claim 18, wherein the lumped online method of optimization includes a single optimization and control algorithm and the dynamic genset model.

* * * * *